United States Patent
Folke et al.

(10) Patent No.: US 6,339,739 B1
(45) Date of Patent: Jan. 15, 2002

(54) SYSTEM FOR CONTROLLING THE MOTION OF A VEHICLE

(75) Inventors: Reiner Folke, Kornwestheim; Jost Brachert, Ditzingen; Asmus Volkart, Tamm; Albrecht Irion, Stuttgart; Jens Fiedler, Thaluuassing; Rolf Maier-Landgrebe, Kernen; Michael Schubert, Althengstett, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,044
(22) PCT Filed: May 20, 1999
(86) PCT No.: PCT/DE99/01510
   § 371 Date: Jul. 14, 2000
   § 102(e) Date: Jul. 14, 2000
(87) PCT Pub. No.: WO00/10837
   PCT Pub. Date: Mar. 2, 2000

(30) Foreign Application Priority Data

Aug. 24, 1998 (DE) .......................... 198 38 336

(51) Int. Cl.[7] ................................. G06F 7/70
(52) U.S. Cl. ............................ 701/70; 701/29; 701/78; 180/170; 340/438
(58) Field of Search ............................ 701/29, 43, 70, 701/72, 76, 78, 92; 340/825.06, 825.16, 438, 3.1, 3.43; 303/133, 146, 147; 180/170, 197; 477/28

(56) References Cited

U.S. PATENT DOCUMENTS

| | | | | |
|---|---|---|---|---|
| 3,638,770 A | * | 2/1972 | Frill et al. ..................... | 477/28 |
| 4,835,693 A | * | 5/1989 | Smith et al. .................. | 701/70 |
| 5,351,776 A | | 10/1994 | Keller et al. | |
| 6,052,641 A | * | 4/2000 | Wuerth et al. ................ | 701/70 |

FOREIGN PATENT DOCUMENTS

| | | |
|---|---|---|
| DE | 196 37 209 | 4/1998 |
| DE | 197 09 318 | 9/1998 |

OTHER PUBLICATIONS

"Open Systems and Interfaces for Distributed Electronics in Cars (OSEK)" by U. Kiencke et al, SAE Technical Paper Series, pp. 71 to 78.

"CARTRONIC—An Open Architecture for Networking the Control Systems of an Automobile" by T. Bertram et al, SAE Technical Paper Series, 1998, pp. 1 to 9.

VDC, The Vehicle Dynamics Control System of Bosch, by A. T. van Zanten et al, SAE Paper 950759, 1995.

\* cited by examiner

*Primary Examiner*—Gertrude Arthur
(74) *Attorney, Agent, or Firm*—Walter Ottesen (57) ABSTRACT

A system for controlling the motion of a vehicle is suggested which includes several levels. In a first level, at least one component is provided for controlling the vehicle motion which, in a further level, includes, as a refinement, a component "propulsion and brake". In a third refinement level, this component is structured at least into the components "propulsion"and "brake system".

13 Claims, 8 Drawing Sheets

| Detailing Level 1 | Detailing Level 2 | Detailing Level 3 | Detailing Level 4 | Detailing Level 5 | Detailing Level 6 |
|---|---|---|---|---|---|
| Vehicle Motion | Vehicle Motion Coordinator | Vehicle Motion Controller | Wheel Control Desired Values | | |
| | | | Torque Collector | | |
| | | Wheel Control | | | |
| | | | Wheel Slip Control Drive Case | | |
| | | | Wheel Slip Control Brake Case | | |
| | Wheel Quantities (4) | | | | |
| | Chassis | | | | |
| | Steering | | | | |
| | Propulsion and Brake | Torque Distributor | Torque Selection | | |
| | | Driver Command Longitudinal Movement | | | |
| | | | Brake Delay Conversion | | |
| | | | ACC Acceleration Controller | | |
| | | Propulsion | Differential | | |
| | | | Propulsion Power | | |
| | | | Propulsion Order | | |
| | | | | Accelerator Pedal | |
| | | | | Road Speed Controller | |
| | | Brake System | Wheel Brake Coordinator | | |
| | | | Wheel Brake (4) | | |
| | | | Brake Loop (2) | Pressure Buildup | |
| | | | | Return Pumping | |
| | | | | Pressure Modulation | |
| | | | | Switchover Valve Control | |
| | | | | Intake Valve Control | |
| | | | Pumps | Pump Coordinator | |
| | | | | RFP Control | |
| | | | | VLP Control | |
| | | | Brake Command | Brake Pedal | Pedal Return Effect |
| | | | | Hydraulic Brake Assistants | |
| | | | | Hillholder | |
| ACC | | | | | |

SYSTEM FOR CONTROLLING THE MOTION OF A VEHICLE

This Application claims the benefit of 371 PCT/DE99/01510 filed May 20, 1999.

FIELD OF THE INVENTION

The invention relates to a system for controlling the motion of a vehicle.

BACKGROUND OF THE INVENTION

Figure 11:
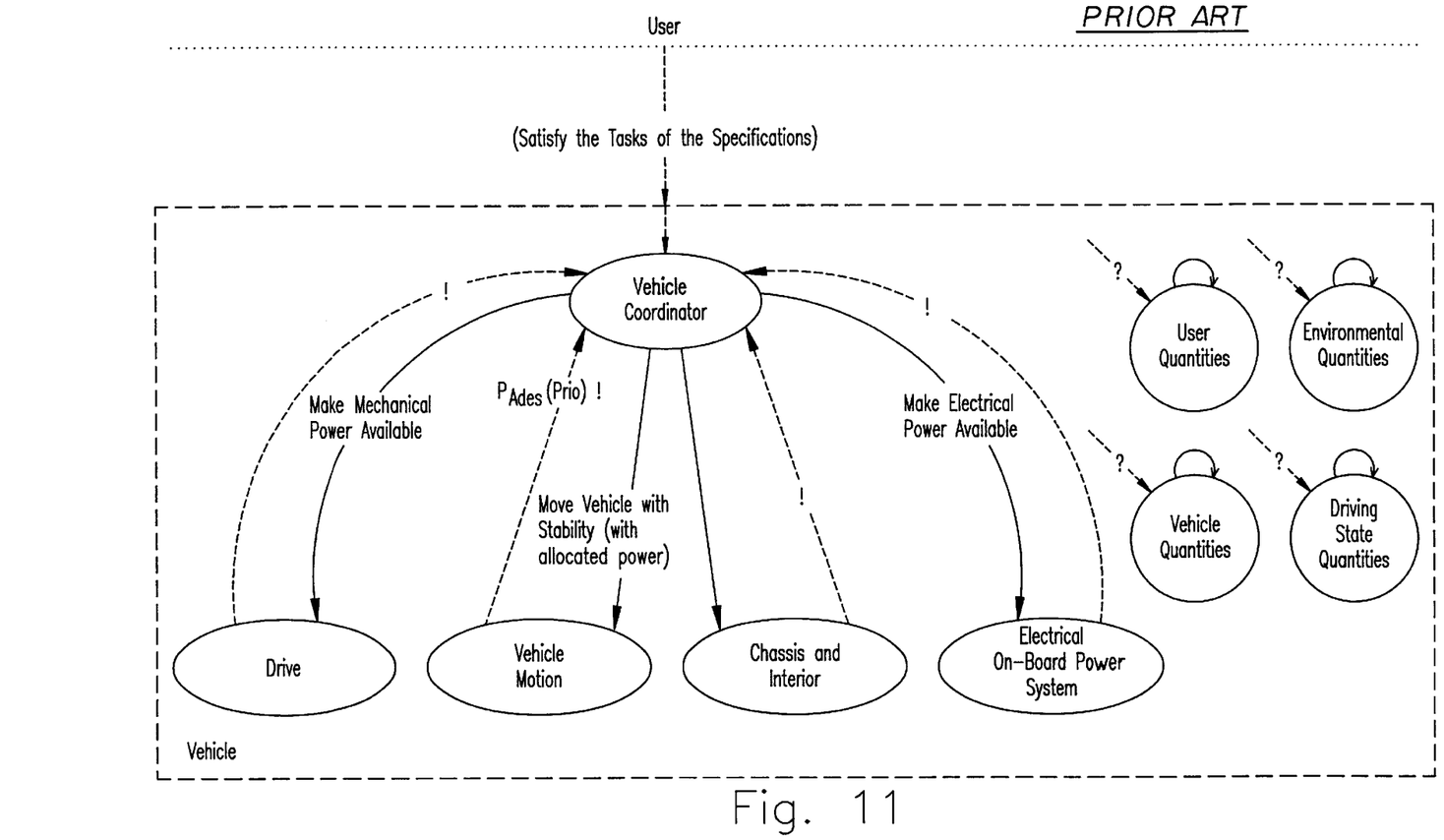
FIG. 11 shows the component "vehicle motion" as part of the uppermost level of the vehicle structure; and, FIG. 12 shows a detailing of the component "vehicle motion".
Figure 12:
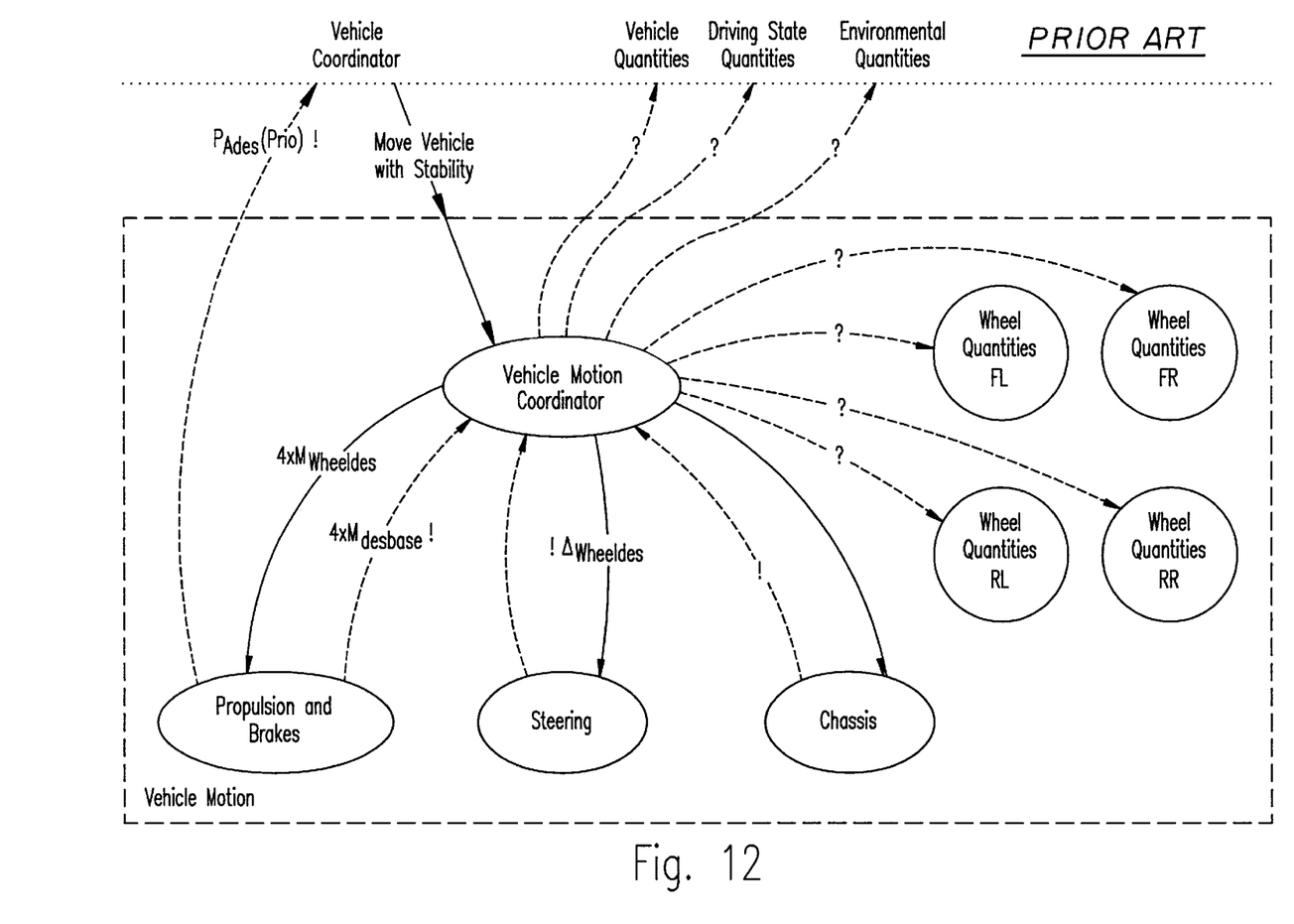

A control system for a total vehicle is known from SAE paper 980200 "Cartronic—An Open Architecture for Networking the Control Systems of an Automobile" by Torsten Bertram, Rainer Bitzer, Rainer Mayer and Asmus Volkart (Feb. 23 to 26, 1998). In this system, the individual components or objects of the vehicle control are arranged in the context of a pregiven structure having pregiven communication relationships. The structure includes different detailing levels and the uppermost level comprises the components "vehicle coordinator", "control for the drive", "control for the vehicle motion", "control for the chassis/interior space" as well as the "control for the electrical on-board network". This uppermost detailing level is shown in FIG. 11. The respective components are detailed in additional subordinate levels such as shown in FIG. 12 with the example of the component "vehicle motion". In a first detailing level, this component comprises a coordinator for the vehicle motion, controls for propulsion and brake, for the steering and for the chassis.

For controlling the vehicle, the individual components communicate with each other in the context of permanent pregiven communication relationships. These include orders, acknowledgments, inquiries and requests. Desired quantities are transmitted by the order giver to the receiving components for adjustment via the communication relationship "order". If the component to which the order has been given is not in the position to satisfy the order, then an acknowledgment is sent back which is possibly provided with the reasons therefore. In the figures, orders are shown as solid arrows with exclamation marks. The communication relationship "inquiry" serves for detecting data such as measurement quantities. In inquiries, the inquiring component asks data of the questioned component such as a measured value. This is symbolized in the figures by a broken arrow with a question mark. For requests, the requesting component transmits a value to the questioned component which should be adjusted by the requested component. This is symbolized in the figures with broken arrows having exclamation signs. The vehicle control takes place with the aid of all of the illustrated components as well as the interface definitions described hereinafter in the context of the above communication relationships.

The described software structure can be defined on any desired hardware structure and guarantees an optimal control of the vehicle. Here, the components influence each other only via few exactly defined interfaces via which the data as to physical quantities are transmitted. A further detailing of the components "vehicle motion" is not shown in this state of the art.

SUMMARY OF THE INVENTION

It is an object of the invention to provide a suitable structure for the component "vehicle motion".

SAE paper 950759 (Feb. 27 to Mar. 2, 1995) entitled "VDC, The Vehicle Dynamics Control System of Bosch" by Anton T. van Zanten, Rainer Erhard and Georg Pfaff discloses a dynamic vehicle motion controller with the aid of which the stability of the dynamic motion is maintained by inputting desired torques to the individual wheels.

U.S. patent application Ser. No. 09/254,197 now U.S. Pat. No. 6,226,581, filed Apr. 2, 1998, disclosed how a dynamic vehicle motion control can be expanded by further control units such as steering actuators and/or chassis actuators. The arrangement described therein includes means for detecting quantities, which represent the dynamic vehicle motion, as well as the commands of the driver. The commands of the driver are detected by measuring quantities which the driver adjusts via the vehicle operator-controlled elements such as steering wheel angle, prepressure or brake pedal position and accelerator pedal position. Furthermore, the arrangement includes at least two control devices which carry out control interventions for stabilizing the vehicle. The control devices carry out these interventions with the aid of suitable actuators based on the detected quantities. At least one of the control devices intervenes in the steering of the vehicle. Furthermore, at least one of the control devices intervenes in the brakes and/or in the engine of the vehicle and/or a further control device intervenes in the chassis actuators. For the control interventions into the steering of the vehicle, the forward steering angle or the change of the forward steering angle is inputted, for example, as a desired value. This desired value is converted with the aid of an actuator control into corresponding signals for influencing the steering actuator. For carrying out the chassis control, preferably a value for the damping hardness or for the spring hardness or a value for the desired level to be adjusted is pregiven as a desired value. This desired value is converted with the aid of the actuator control into corresponding signals for influencing the chassis actuators.

ADVANTAGES OF THE INVENTION

The solution according to the invention described below provides a suitable structure for the component "vehicle motion". This solution achieves also for this component the advantages of the concept, which is described in the state of the art, especially with respect to reducing complexity, the functionality, the exchangeability of subsystems, the advantages with respect to the development and incorporating new subsystems as well as for the improvement of existing subsystems and especially with respect to the interrelationship of different functions, et cetera. In this way, the complex network system can be mastered for controlling the vehicle motion in an advantageous manner.

BRIEF DESCRIPTION OF THE DRAWINGS

The invention will now be described with reference to the drawings wherein.

DESCRIPTION OF THE PREFERRED EMBODIMENTS OF THE INVENTION

In FIG. 11, the component "vehicle motion" is shown as part of the uppermost level of the vehicle structure, the vehicle level.

The component "vehicle motion" receives an order from the vehicle coordinator having the content to move the vehicle in correspondence to the driver input and to guarantee the stability of the motion. As a boundary condition, the power amount can be given with this order with the power amount being available for the purpose of the vehicle movement. This becomes necessary when the power is distributed, in accordance with different priorities, to the components of the vehicle level according to the strategy implemented in the component "vehicle coordinator" (higher-ranking power management). The power is distributed by the component "drive", in which the engine, transmission, et cetera and the corresponding controls are arranged.

The request relationship PAdes (Prio) goes from the component "vehicle motion" to "vehicle coordinator". This identifies the power which should be made available by the drive for propulsion purposes. This power is necessary in order to realize the wheel torques required by the component "propulsion and brake". Because of the priority given as a boundary condition, the vehicle coordinator will coordinate this request with competing requests for power of other components and satisfy the request or reduce the request because of other more important requests.

The following are shown as an example for the interfaces between vehicle coordinator and drive: the order "make mechanical power available" as well as a request relationship coming from the drive to the vehicle coordinator. Via this request relationship, the drive transmits which resource requirement (for example, in electric power) it has itself in order to satisfy the above-mentioned order. The interface is configured correspondingly between the vehicle coordinator and the electric on-board network for making electric power available.

For the components, important data on the vehicle level are the components: vehicle quantities, environmental quantities, driving condition quantities and user quantities. Environmental quantities describe the environment independently of the presence of a vehicle (for example, outside temperature, air pressure, wind), vehicle quantities include the interaction of the vehicle with the environment (for example, spacing to vehicles ahead, friction values, et cetera). These components are inquired by other components (for example, of the vehicle motion) via inquiry relationships for obtaining data and the transmitted data (for example, measurement value) are evaluated in the context of the function of the inquired component.

In FIG. 12, a detailing of the component "vehicle motion" is shown. The task of the component "vehicle motion" is the execution of the order of the vehicle coordinator, namely the movement of the vehicle in accordance with the wishes of the driver while at the same time ensuring the driving stability. This general order can be combined with the specific statement as to the power which is available for the propulsion of the vehicle.

The systems such as steering, brakes, propulsion, et cetera are assigned to the component "vehicle motion". These systems exist for controlling the execution of the order in the vehicle.

The functionalities such as control of dynamic vehicle motion (FDR), drive slip control (ASR) and anti-blocking control (ABS) are part of the component "vehicle motion". These functionalities are required for ensure the stability of the vehicle movement. The component "vehicle motion" generates all actuator drives, which determine the vehicle motion. As positioning systems, the vehicle motion contains the brake system, the propulsion (both of the longitudinal dynamic), the steering (transverse dynamic) and/or the chassis (vertical dynamic). The effects of the actuator actuation in the different degrees of freedom are greatly coupled. For this reason, the effects must be coordinated within the component "vehicle motion" and must be optimized in their other effects on the total vehicle motion. Furthermore, the component "vehicle motion" detects the driver command affecting the vehicle motion. This takes place by evaluating the actuation of the corresponding actuator-controlled elements (pedals, steering wheel). The determination of the driver command can be supplemented by assistant systems (for example, brake assistant, hill holder) or assumed for a time by the system in response to the driver command (for example, road speed control, adaptive road speed controller (ACC), et cetera).

The vehicle motion is observed in order to monitor the stability of the vehicle motion and an intervention takes place when danger is recognized. The nature of the intervention can, for example, be executed in a manner of a conventional ABS/ASR control or an FDR control.

The order for stable motion corresponding to the driver command goes from the vehicle coordinator to the component "vehicle motion". The request relationship PADES (Prio) goes from the vehicle motion to the vehicle coordinator. The request relationship goes directly from the component "propulsion and brake" to the vehicle coordinator.

The first detailing level of the component "vehicle motion" is shown in FIG. 12 and includes an internal coordinator, namely the coordinator "vehicle motion" which is the receiver of the order from the vehicle coordinator. The coordinator "vehicle motion" orders the operative components, which are to be coordinated, namely: propulsion and brake, steering and chassis. These represent the three degrees of freedom of motion of the vehicle which are to be influenced in a matched manner for controlling the total motion. The coordinator "vehicle motion" contains all components which monitor and control (open-loop or closed-loop) the vehicle motion while considering the coupling of the individual degrees of freedom. This includes, for example, large parts of the dynamic vehicle motion control (FDR) or a drive slip control (ASR) and parts of the anti-blocking control (ABS), which have effects on the vehicle motion beyond the pure longitudinal dynamic. These include, inter alia, the components which are responsible for the vehicle motion control and for the wheel control because a brake intervention on an individual wheel can have an influence on the motion in several degrees of freedom.

As an order, desired wheel torques (Mwheeldes) are transmitted for each wheel from the vehicle motion coordinator to the component "propulsion and brake". These desired wheel torques are computed, for example, in accordance with conventional methods for each wheel in accordance with the functions, which are implemented in the motion coordinator, on the basis of the driver brake command. The functions include FDR, ABS, ASR, et cetera. Corresponding order relationships are defined between the coordinator "vehicle motion" and the components "steering" and/or "chassis".

A further subcomponent of the vehicle motion is the component "wheel quantities", which is present once for each wheel. This component is made up of data transducers which make available wheel-specific quantities to other components in response to an order. In this component, the following, for example, takes place: the evaluation of the wheel speed sensors, the signal preparation for wheel speed and wheel acceleration detection and/or the preparation of other wheel-characteristic quantities such as slip, effective forces on the wheel, slip angle, steering wheel angle, et cetera. These quantities have no effect on the higher-ranking vehicle level but are of encompassing significance for the vehicle motion and the components which are present here. For this reason, the arrangement of the component "wheel quantities" takes place on the first detailing level of the component "vehicle motion". The individual components make inquiries as to the corresponding values via the inquiry communication relationships. The determination of these quantities takes place internally on the basis of the evaluation of sensors and via computations by algorithm. The manner in which these quantities are determined remains unknown to the inquirer. The inherent order (not made by another component) of the component "wheel quantities" is the determination of the wheel quantities and the transmission to the inquirer. The inquiry takes place directly from almost all components of the component "vehicle motion".

An order relationship and a request relationship is present between the component "vehicle motion coordinator" and the component "propulsion and brake". The coordinator "vehicle motion" orders the component "propulsion and brake" to realize a desired torque Mwheeldes at each wheel. The adjustment of these torques leads to the desired vehicle motion. The component "propulsion and brake" requests the adjustment of the desired wheel torques Mdesbase from the coordinator.

Various operator-controlled devices are available to the driver for operating on the vehicle motion. These are, in general, accelerator pedal and brake pedal, as well as the steering wheel. Each operator-controlled element belongs in this structure to the subsystem for whose actuation it serves. Accordingly, the accelerator pedal is arranged in the component "propulsion" given below, the brake pedal is arranged in the braking system and the steering wheel is arranged in the component "steering". The corresponding measurement quantities are detected by components, which process these measured quantities, in the context of inquiry relationships. Within the component "propulsion and brake", the detection of the driver command with respect to the longitudinal movement takes place. This driver command is transmitted to the system by the actuation of the accelerator pedal and the brake pedal. If required, assistant systems can make the tasks easier for the driver and provide an alternative driver command. These assistant systems are FGR, brake assistant, ACC likewise within the component "propulsion and brake". All actuations of the system-specific operator-controlled elements are taken together within the component "propulsion and brake" to a relevant longitudinal dynamic request. This longitudinal dynamic request is transmitted in the context of a request as desired wheel torques Mdesbase to the coordinator "vehicle motion". In this way, the realization of the so-determined driver inputs is requested from the coordinator "vehicle motion". This coordinator controls whether the commands can be realized during stable travel and, in the normal case, returns the order to realize the checked values back to the component "propulsion and brake" and, if needed, to "steering" and/or "chassis". However, if the coordinator "vehicle motion" determines by inquiry at the component "wheel quantities" or at the component "vehicle quantities" that the travel dynamic limits are reached, then the coordinator changes the desired quantities to the extent that no critical driving situations can occur or engages the other available systems for reducing the risk. In these cases, the requested command quantities differ from the desired quantities to be realized.

The involvement of the components "steering" and/or "chassis" takes place in the same way. For example, interfaces are provided as described in the state of the art initially described herein. Accordingly, the driver command is evaluated in the component "steering" by actuating the steering wheel and a corresponding request is transmitted to the coordinator "vehicle motion". This coordinator transmits a desired value ides for the steering angle as an order.

Figure 5:
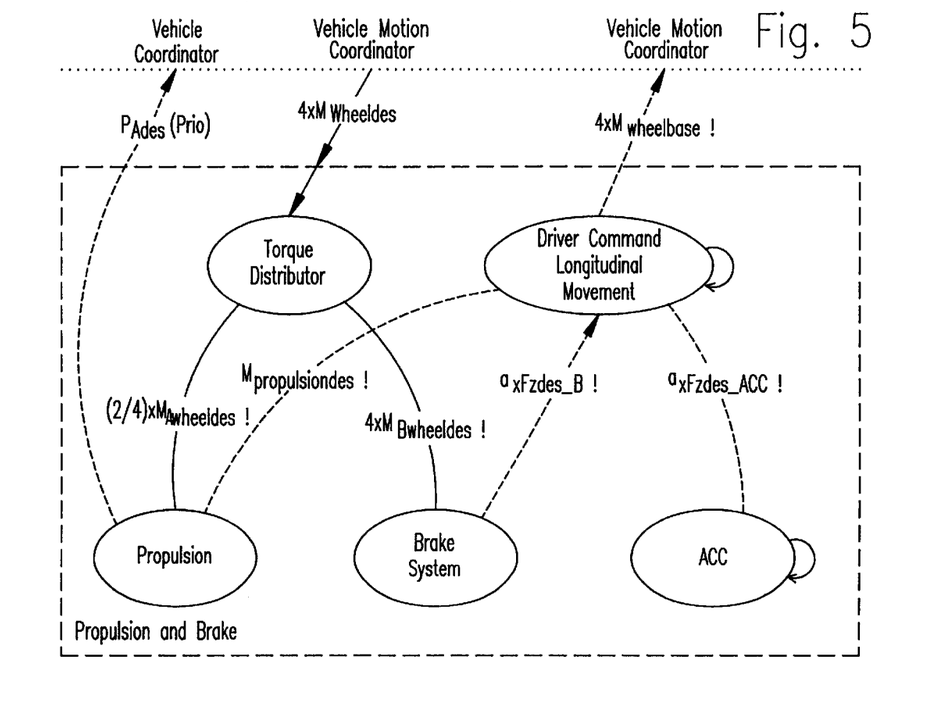
FIG. 5 shows a detailing of the component "propulsion and brake"

FIG. 5 shows a detailing of the component "propulsion and brake". The component "propulsion and brake" includes all systems for influencing the longitudinal dynamic, that is, for influencing acceleration and deceleration. The driver command relating to the longitudinal movement is determined in this component from the actions of the driver on the operator-controlled elements of the relevant subsystems and, if required, supported by assistant systems. Furthermore, the pregiven desired wheel torques are realized by these components. For this purpose, the actuators are to be used which are driven directly or by subsystems. The transmitted desired or command torques are transmitted between the component "propulsion and brake" and the vehicle motion coordinator and concern the drive case as well as the braking case. Initially, in addition to the request relationship to the vehicle motion coordinator, a request relationship to the vehicle coordinator is present via which the power, which must be made available from the drive for propulsion purposes, is requested. This power is so computed that the wheel torques Mwheeldes, which are to be adjusted by the component "propulsion and brake", can be realized. The contained components and subsystems are the operative systems "propulsion" and "brake system", the assistant system ACC as well as the coordinating components "torque distributor" and "driver command longitudinal movement".

The component "torque distributor" defines the input component of the component "propulsion and brake". The torque distributor receives the external order with respect to the desired torques Mwheeldes, which are to be adjusted, from the vehicle motion coordinator. This order is so distributed by the torque distributor that a coordinated drive of the actuators in the subsystems "propulsion and brake system" takes place and the order for the realization of four pregiven wheel torques is satisfied. The torque distributor ensures the coordinated drive of all subsystems which directly influence the torque acting on each wheel. These are brake torques as well as the drive torques acting on the wheel drive shafts. The drive torques are determined from the actual drive torque as well as its distribution to the individual wheels by the differential. Drive and differential are driven via the component "propulsion". The torque distributor thereby orders the brake system and the propulsion so that the wheel torques adjust which are to be realized by the torque distributor. If there are additional positioning systems for influencing the wheel torque (for example, retarder), then these are likewise ordered by the torque distributor.

The torque distributor must know the actual possibilities of the subsystems in order to achieve a coordination of the subsystems. For this purpose, the maximum or minimum realizable torque values at the current operating point are inquired from the component "propulsion" (not shown in FIG. 5). Likewise, the possible torques are inquired under specific boundary conditions in order to consider these criteria in the decision as to the nature of the torque realization. For example, a maximum delay via the drag action of the engine can be avoided because of reasons of noise in the normal case but, for intense wear or high temperatures of the brakes, the drag effect can be used to protect the brakes.

As communication relationships of the torque distributor there are the incoming order from the vehicle motion coordinator for realizing the desired torque inputs at the wheels as well as the order, which proceeds from the vehicle motion coordinator, to the component "propulsion" via two or four (depending on type of drive) desired drive torques MAwheeldes which are to be adjusted. This corresponds to the torques at the wheel drive shafts. These torques can be positive as well as negative (engine drag). Furthermore, the order goes to the brake system via four brake torques MBwheeldes which are to be adjusted. These correspond to the torques which are generated and supported via the brake discs or brake drums. These can only be negative. Furthermore, an inquiry (not shown) to the propulsion takes place as to the propulsion torque (that is, the maximum drag torque) under specific boundary conditions, which is minimal in the current operating point. This propulsion torque is needed in the case of negative wheel desired torque inputs. Negative wheel desired torque inputs can be realized by the brake system as well as by the propulsion, but only to a limited extent by the latter. To distribute the order to the subsystems, the potential with respect to the propulsion is to be determined because this is used most preferably and only the remaining portion is to be realized by the brake system. Under boundary conditions, it is understood that possibly additional quantities are transmitted such as comfort to be adjusted, noise, et cetera. These quantities are connected to the minimum propulsion torque. In this way, these criteria can be taken into the decision as to the selection of the torque realization.

The component "driver command longitudinal acceleration" coordinates the command quantities, which are pregiven by the driver via the different operator-controlled devices, in accordance with a pregiven strategy which can correspond to the conventional coordination of the different actuating quantities and conducts these further. These commands come as requests of the components "propulsion", "brake system" and, if required, ACC. The component "driver command longitudinal movement" inquires, for example, from the component ACC, whether the system is activated. If there are no further requests from the component "propulsion and brake system", a realization of the ACC command (command acceleration axfzdes_ACC) is requested from the coordinator "vehicle motion". If accelerator pedal or brake pedal are actuated, then their command quantities axfzdes_B and Mpropulsiondes usually have priority and the ACC command is overriden. Algorithms as to system performance for simultaneous actuation of accelerator pedal and brake pedal are also to be arranged in the component "driver command longitudinal movement". Furthermore, the conversion of the requested accelerations into torques takes place. The component "driver command longitudinal movement" detects the needed operating quantities by inquiring relationships (not shown) from corresponding data transducers. The component "driver command longitudinal movement" requests the determined command wheel torques from the coordinator "vehicle motion" which realizes these torques via order issuance.

The component "propulsion" determines, in turn, the power PADES (Prio), which is required for the wheel torque realization and requests from the vehicle coordinator that they be made available. The vehicle coordinator adjusts the commanded desired torque via order issuance to the component "drive" via control of the drive unit (engine, transmission, converter, et cetera).

The component "brake system" realizes the wheel brake torques via corresponding driving of the actuating elements which, depending upon the concept (hydraulic, pneumatic or electromotor brake system) utilized, can be different.

Figure 1:
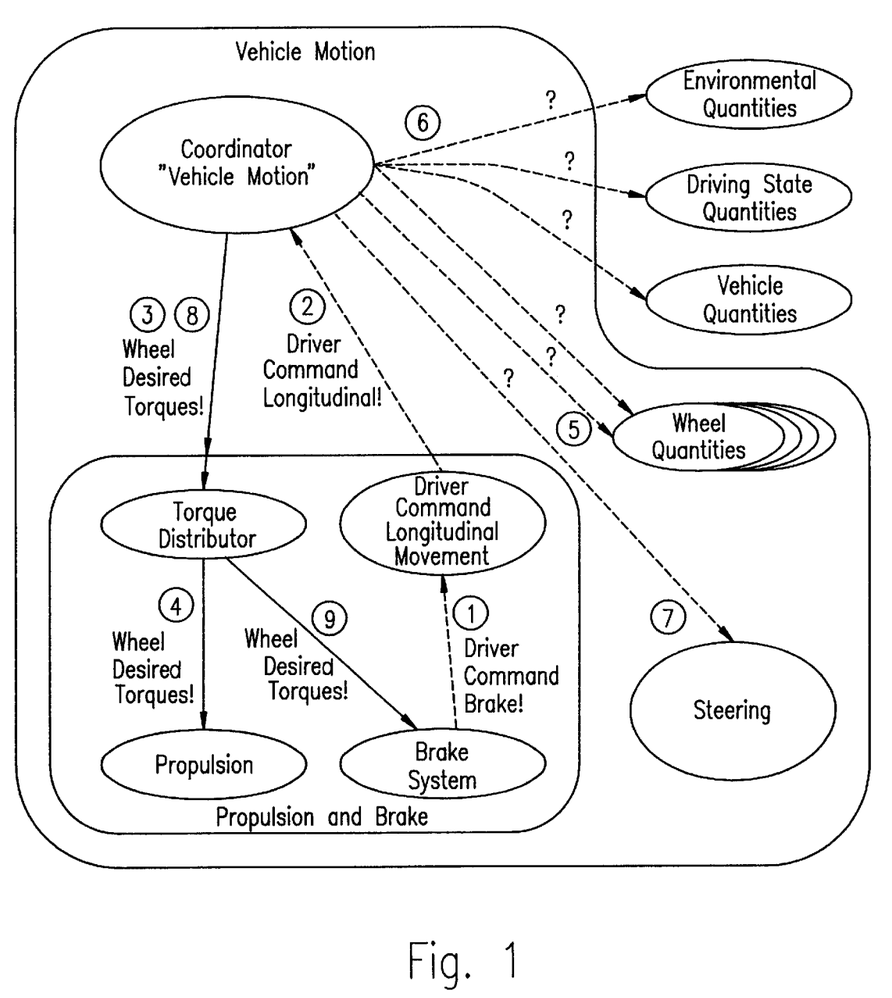
FIG. 1 shows a sequence for the start of an ABS intervention.

In this way, the sequence shown in FIG. 1 results as exemplary for the start of an ABS intervention. The sequence is in the described structure, for example, in the context of a usual dynamic vehicle motion controller. It should be noted that, in this drawing, not all components and systems are shown. Instead, only those components that participate are shown for reasons of a better overview.

First, the brake system requests the realization of the driver command 1 inputted by the brake pedal. The component "driver command longitudinal movement" recognizes the brake command as relevant and directs resulting requests to the coordinator "vehicle motion" too. The coordinator "vehicle motion" checks the longitudinal dynamic command with respect to stability effects and recognizes no intervention requirement and orders the component "propulsion and brake" with the realization 3. The torque distributor orders the components "propulsion" and/or "brake system" with the conversion of the distributed wheel desired torques 4. At least at one wheel, the tendency to block occurs. The coordinator "vehicle motion" recognizes the control requirement from observation of the component "wheel quantities" 5. The coordinator "vehicle motion" determines the vehicle actual motion 6 as well as the vehicle desired motion 7 and determines realizable wheel torques (wheel control) and considers effects of the wheel torques on the vehicle motion. The coordinator "vehicle motion" orders "propulsion and brake" to realize the adapted wheel desired torques 8. The torque distributor then orders the brake system with the realization of the wheel torques9 changed relative to the step 4.

Figure 2:
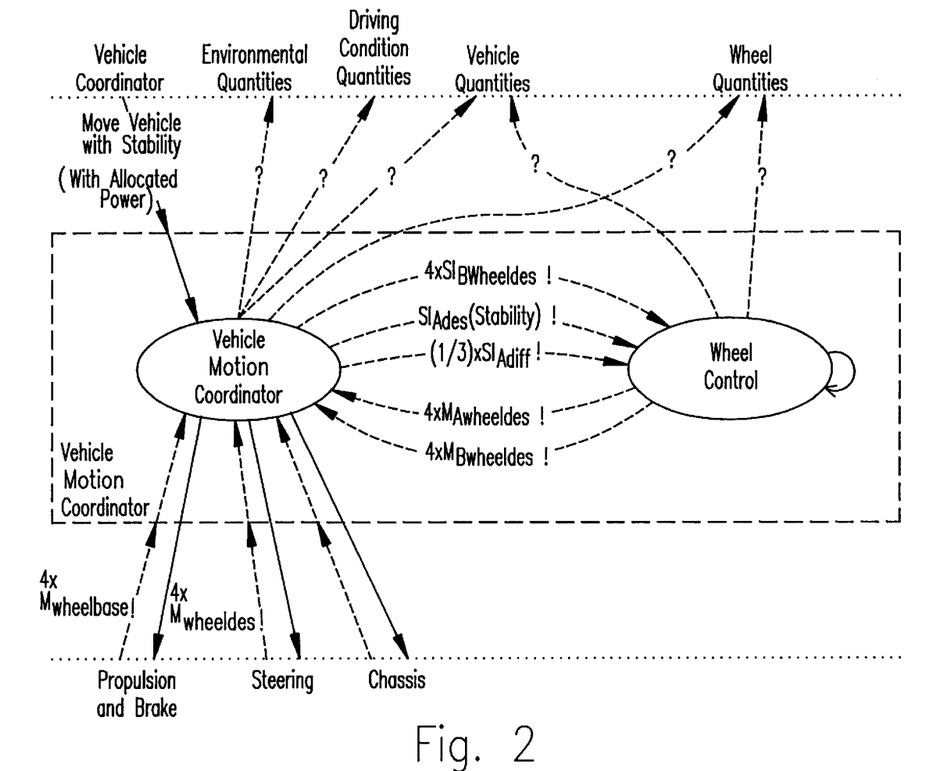
FIG. 2 shows a detailing of the component "vehicle motion coordinator"

FIG. 2 shows a detailing the component "vehicle motion coordinator". The component "vehicle motion coordinator" ensures the stable motion of the vehicle. For this purpose, the vehicle motion coordinator coordinates the orders to the positioning systems relevant for the vehicle motion. Bases of these commands are the above-shown requests of the independent subordinated systems which contain the driver command. To check the stable realizability of the driver command requests, the vehicle actual movement is observed. This takes place with inquiries of the vehicle motion quantities and the wheel motion quantities at the corresponding components in the higher-ranking level and the component "wheel quantities" in the same level. The evaluation of the stability is the task of the vehicle motion coordinator as is controlling stable motion quantities. The computation of the motion quantities, the reference quantities, et cetera, which, for example, are used in present-day dynamic vehicle motion controls, are part of the components "vehicle quantities" or "wheel quantities". The components of these control algorithms, which control the vehicle motion, the vehicle controller and the wheel controller are assigned to the vehicle motion coordinator.

The component vehicle motion coordinator is refined into a vehicle motion controller and a wheel control. The component "wheel control" monitors and controls the braking slip and drive slip at the wheels. This takes place on the basis of inquired data of the component "wheel quantities". The drive case and brake case are to be distinguished for the control because the position possibilities are different. The wheel slip control has no direct intervention on the actuator; instead, the wheel slip control gives its wheel-specific inputs to the vehicle motion controller. These are there checked as to their effect on the motion of the entire vehicle and possibly modified and converted. The wheel control has the task, for example, of adjusting a specific slip at each wheel (as shown in FIG. 2; alternatively, for example, torque, pressure). The desired value is generated within the wheel controller (control to the maximum of the $\mu$-slip curve) or can be pregiven by the vehicle motion controller. When there is no intervention requirement of the vehicle motion controller, this desired value is converted.

The vehicle motion controller must always have the possibility to influence the distribution of the wheel forces into a longitudinal guiding force and a lateral guiding force and thereby the motion of the vehicle overall. This takes place by influencing the internal desired value computation of the wheel slip of the wheel control. This must take place separately for the drive case and braking case because of the different actuator element couplings. This is so because, for the braking case, all four wheels can be individually braked; whereas, for the drive case, only the driven wheels, which are coupled to each other, are available. In the case of braking, the vehicle motion controller can overbrake or underbrake individual wheels and so effect an undercontrol or overcontrol for stabilizing the vehicle. The communication relationships needed for this purpose are as follows. The order "move vehicle with stability" is transmitted from the vehicle coordinator to the vehicle motion controller. The vehicle motion controller determines the wheel forces, which are required for realizing the vehicle desired motion, and the corresponding slips at the wheels. The vehicle motion controller transmits the desired slip SlBwheeldes as a request to the wheel slip controller for each wheel in the case of braking; likewise, in the case of propulsion, an order SlADes (stability) is sent which limits the mean slip of the drive wheels. As a boundary condition, a stability index can be given which determines the sensitivity of the control. Furthermore, the limitation of the slip difference of the drive wheels is transmitted as order SlAdiff from the vehicle motion controller to the wheel controller. In the case of one drive axis, one value is transmitted and for all wheel drive, up to three values are transmitted. As a request MAwheeldes, MBwheeldes, the input of the desired torque per wheel to be adjusted is transmitted from the wheel slip controller to the vehicle motion controller, in the case of propulsion or in the case of braking. The specific procedure then corresponds, for example, to the procedure for the conventional dynamic vehicle motion controller.

Figure 3:
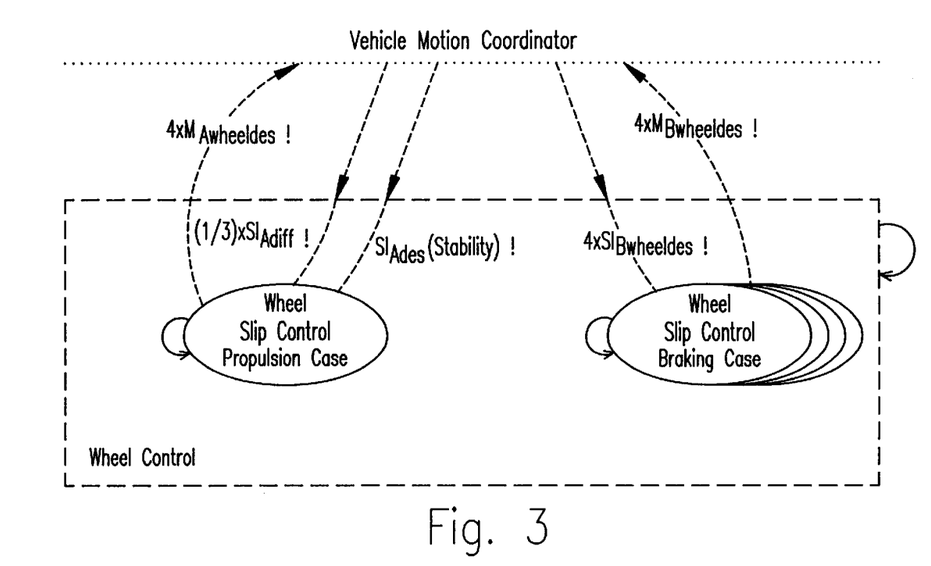
FIG. 3 shows a detailing of the component for wheel control.

FIG. 3 shows the detailing of the component for wheel control. The wheel control includes a wheel slip controller for the drive case and a wheel slip controller for the case of braking. The above-mentioned values are transmitted to the components for wheel control and the above-mentioned values proceed therefrom. In a preferred embodiment, the controllers are configured in correspondence to the conventional procedures with dynamic vehicle motion controllers. An inherent order of these components is the control in correspondence to the desired quantities.

Figure 4:
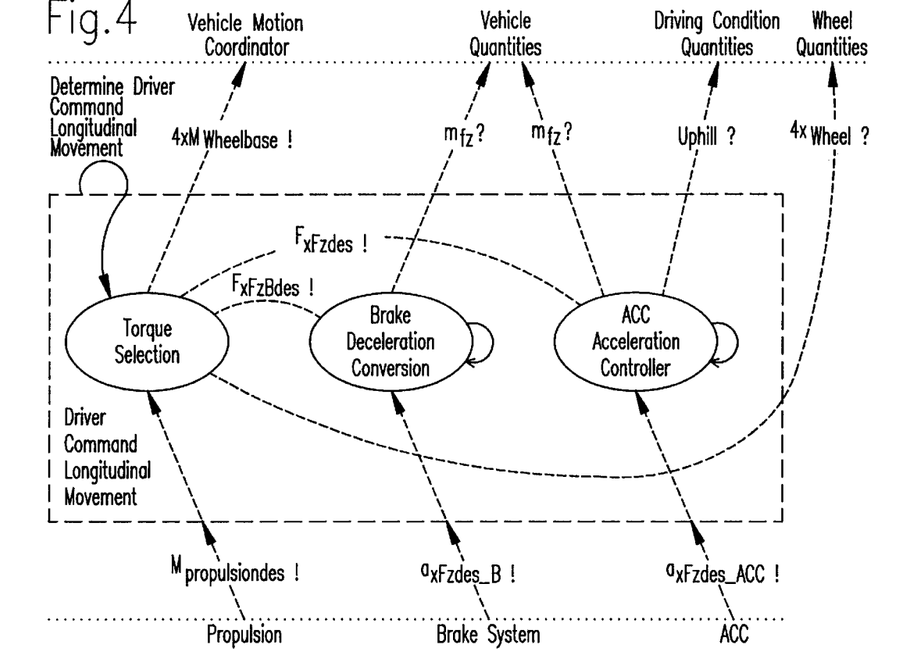
FIG. 4 shows a detailing of the component "driver command longitudinal movement"

The component "driver command longitudinal movement" is already shown and is sketched in a detailing in FIG. 4. This component coordinates all longitudinal movement requests generated in the subsystems. These result from the actuation of the particular operator-controlled elements which are disposed in the subsystems. Depending upon the actual operating state of the vehicle, this component determines the relevant request and transmit this request outwardly to the vehicle motion coordinator. The requests of the subsystems occur in vehicle associated quantities. The consolidated request to the vehicle motion coordinator is outputted in the form of wheel torques. For this reason, the driver command longitudinal movement component has the further task of undertaking a suitable distribution of the vehicle associated quantities to the wheel associated quantities. This takes place merely in view of the desired vehicle longitudinal dynamic. This task is executed in the torque selection component. In a preferred embodiment, the torque distribution to the wheels takes place in the form of a base distribution, for example, when braking, 60:40 forward:rear and equal to the side and with propulsion, the torque distribution is uniform to the drive wheels. Furthermore, an algorithm is provided in the driver command longitudinal movement component which gives priority to a request in dependence upon the situation, for example, an overcontrol of the ACC function per pedal. The requests of some subsystems do not take place on the basis of torque and must be converted. This takes place in the components "braking delay conversion" and the "ACC acceleration controller". In the case of the ACC acceleration controller, external disturbances such as uphill, downhill, wind and friction coefficient changes are to be considered.

Inherently, the order is there for the driver command longitudinal movement component to coordinate the longitudinal movement requests. The request relationship with respect to the requested propulsion torque Mpropeldes comes from the propulsion component and this propulsion torque is determined from the accelerator pedal position or the assistant system. This torque corresponds to the torque at the transmission output and is used only for propulsion purposes. The part of the drive power, which was made available for ancillary equipment, is already subtracted. This request goes directly to the torque selection component. The request as to a requested delay axfzdes_B comes from the brake system on the basis of the actuation of the brake pedal. This request goes to the brake delay conversion component. Correspondingly, the request relationship with respect to the requested acceleration axfzdes_ACC (positive or negative) is between the ACC acceleration controller and the ACC component. In contrast to the brake pedal actuation, here external disturbances such as uphill, downhill, wind or friction changes still are to be considered and, for this reason, corresponding inquiry relationships of the component ACC controller are present. From the driver command longitudinal movement component, a request relationship goes to the vehicle motion coordinator with respect to the input of four wheel torques Mwheelbase, which are to be adjusted and which can be negative as well as positive. The following required inquiries are not shown in FIG. 4 for reasons of clarity: for example, the vehicle mass (to convert a vehicle acceleration into a resulting longitudinal force) to the component "vehicle quantities"; for example, the slope (to compensate the resulting driving resistance) to the component "vehicle state quantities"; or, for example, the wheel radii (for converting the longitudinal force referred to the vehicle into wheel torques) to the component "wheel quantities". Furthermore, request relationships of the braking delay conversion or the ACC acceleration controller are provided for the torque selection and with respect to the desired forces (FxFhBdes, Fxfzdes) which were determined from the desired quantities supplied to these components.

Figure 6:
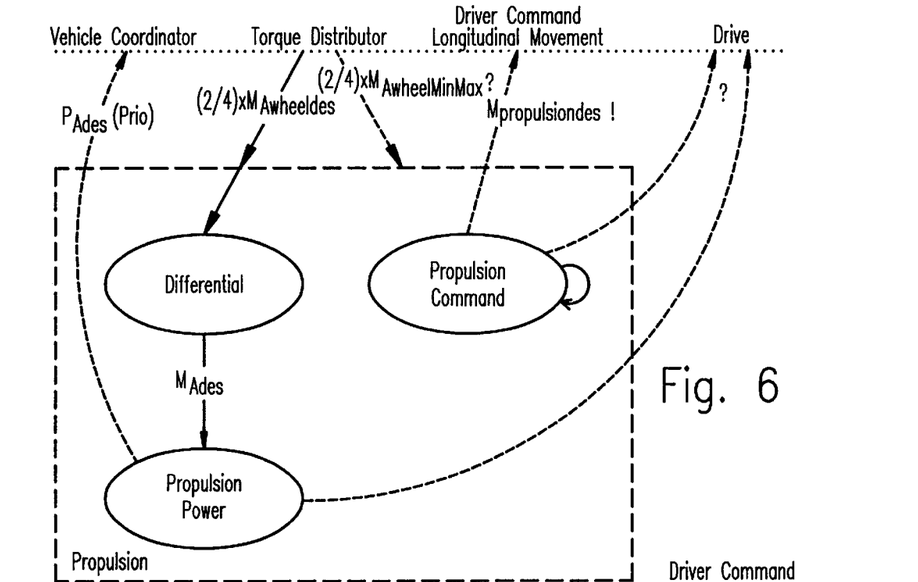
FIG. 6 shows the propulsion component.

In FIG. 6, the propulsion component is shown in more detail. This component comprises essentially the components "differential", "propulsion command" and "propulsion power". These are components which realize the propulsion of the vehicle.

In the component "propulsion power", the drive power PAdes (Prio) is determined while combining the supplied wheel torques and while computing a corresponding power at the transmission output. This drive power PADES (Prio) is required for realizing the wheel desired torques. The preparation of the wheel desired torques is requested for the propulsion purpose directly at the higher-ranking power manager in the vehicle coordinator. There, the different requests are coordinated and prioritized as needed. The drive of the actuators in the engine, converter and transmission, which actuators participate in making the power available, takes place in the component "propulsion" outside of the vehicle motion. Here, other competing requests, for example, from the generator, are to be considered.

The propulsion component, and there the differential component, serves to convert the pregiven desired wheel torques which are supplied to the component from the torque distributor. These torques can be positive or they can be negative insofar as they are realizable by the drive. For this reason, as interfaces, two or four wheel torques are to be provided depending upon the drive concept. The current available minimum and maximum torque per wheel is made available for the coordinating torque distributor so that the pregiven torques are actually realizable. For determining the wheel torques, which are possible in the actual operating point, the propulsion component must put an inquiry to the drive component which determines a corresponding torque value.

A further task of the propulsion component is the detection of the propulsion command of the driver. This takes place by interpreting the accelerator pedal actuation in the propulsion command component. A corresponding request proceeds from the propulsion command component to the driver command longitudinal movement component. Furthermore, the driver can transmit the input of the propulsion command to an assistant system. This then takes over the formulation of the driver command with respect to propulsion such as a road speed controller. If the input of the assistant system not only relates to the actuators of the propulsion, but, for example, also to the brakes (such as for ACC), then this component is to be arranged on the structural level wherein the propulsion and the braking system are coordinated.

As communication relationships, the order from the torque distributor is transmitted to the propulsion component with respect to the pregiven wheel torques MAwheeldes at the drive wheels. The order is given internally to the differential component. Depending upon the drive concept, two or four wheel torques are pregiven. They can be negative as well as positive. The coupling of the wheel torques is determined by the differential. For this reason, the external order is transmitted internally to the differential.

Furthermore, an inquiry takes place from the torque distributor to the propulsion component with respect to the minimum and maximum torque per drive wheel MAwheelminmax. Outgoing communication relationships of the propulsion component are the request to the vehicle coordinator with respect to the power PADES which must be made available for propulsion purposes. This power is computed and outputted by the component "propulsion power". Furthermore, a request Mpropeldes is outputted to the driver command longitudinal movement component from the propulsion command component which determines the requested torque from the accelerator pedal position or an assistant system. This torque corresponds to the torque at the transmission output and is utilized only for propulsion purposes. Furthermore, there are diverse inquiry relationships which proceed from the components "propulsion power" and "propulsion command" and are necessary to make available the actually available minimum and maximum torques per drive wheel as well as for accelerator pedal interpretation. The differential component further outputs a desired torque MAdes, in dependence upon the supplied wheel desired torques, as an order to the propulsion power which converts this desired torque to the request of the power to be adjusted by the drive.

Figure 7:
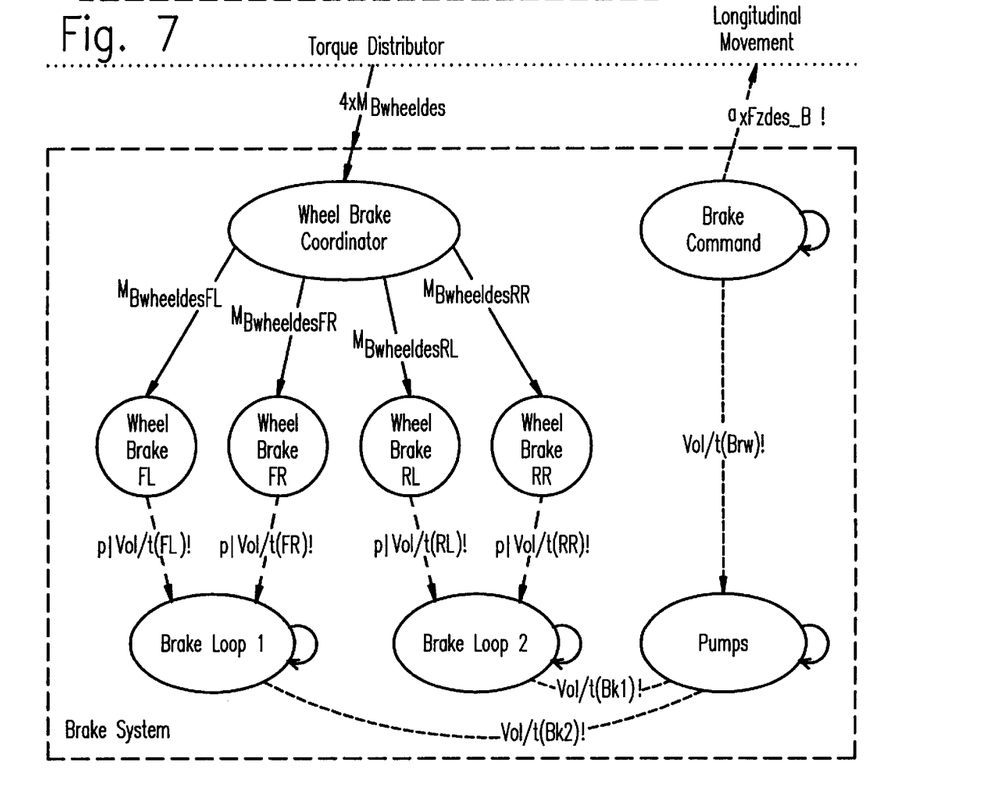
FIG. 7 shows the refinement of the component "brake system"

In FIG. 7, the refinement of the component "brake system" is shown and is exemplary for a hydraulic brake system. As components, the following are given: wheel brake coordinator, wheel brake forward left, wheel brake forward right, wheel brake rearward left, and wheel brake rearward right, the brake loop 1, the brake loop 2, the pumps as well as the brake command. The brake system component includes the systems which exclusively realize the deceleration of the vehicle or maintain the vehicle at standstill. This component serves to convert the pregiven desired wheel torques MBwheeldes, which, in this case, can only be negative, that is, they can only operate to decelerate. Four wheel torques MBwheeldesVL, MBwheeldesVR, MBwheeldesHL and MBwheeldesHR are provided as interfaces between the wheel brake coordinator and the wheel brake components. The possibility to modulate the braking forces at the wheel is a precondition for adjusting the pregiven wheel torques. For hydraulic braking systems, the modulation takes place by pressure buildup and pressure reduction. In electronic control braking systems, the return pump must fulfill different tasks. The hydraulic fluid must be transported away from the wheel brake in order to permit desired reductions and in order to permit no counterpressure to develop below which the wheel brake pressure cannot drop. In electrohydraulic brake systems or brake systems having drive slip control, a pressure generation is required for the brake torque buildup which, in turn, usually takes place with the aid of a pump and possibly with a storage.

For specific environmental conditions, it can happen that the pregiven wheel torques cannot be physically realized, for example, when there is a lower friction value. It can be required that a corresponding feedback takes place with respect to the order.

A further task of the brake system component is the detection of the braking command of the driver. This takes place in the component "brake command" by interpreting the brake pedal actuation. The driver requires a feedback announcement of the system as to the actually adjusted braking action for an input of a command which accommodates this situation. Only then can the driver purposefully meter the braking command. This takes place, as a rule, by a combination of force and displacement at the brake pedal. For this purpose, the return pump or another element, which simulates a pedal return force, can be used. The return pump builds up a return force at the pedal by supplying hydraulic liquid into the main brake cylinder.

The brake command component can also include assistant functions which involve the gradient of the brake pedal actuation, for example, in the nature of a brake assistant. The brake command component requests the realization of the determined brake command from the component "propulsion and brake" and there, from the driver command longitudinal movement component.

If a pedal return action does not occur automatically, a unit is provided which undertakes an artificially generated pedal return action or the driver is warned of the occurrence of, for example, an ABS function, via optical, acoustical or other warning signals. This function is part of the brake command component.

The communication relationships of the brake system component are as an incoming communication the order from the torque distributor to the wheel brake coordinator with respect to the pregiven wheel torques MBwheeldes, which are to be adjusted insofar as physically possible. The requested delay axfzdes_B is determined from the brake pedal position and goes out from the brake command component to the driver command longitudinal movement component. The desired wheel torques are transmitted as a request from the wheel brake coordinator to the corresponding wheel brake components. The wheel brake components, in turn, request the adjustment of a brake pressure p(Fl|Fr|Rl|Rr) or a volume flow Vol/t(Fl|Fr|Rl|Rr) of the brake loop components in the context of request relationships in hydraulic/pneumatic brake systems. These brake loop components, in turn, request, in the manner of the brake command component, a volume flow Vol/t(Bk|Bk2) at the pump component. The determination of the desired volume flows or desired pressures takes place from the supplied quantities in accordance with a model of the hydraulic brake system.

The brake system component has, as its objective, the desired torque conversion into a brake force at the wheel. For this purpose, hydraulic, pneumatic or electromotoric brake systems for the conversion are conceivable. In one embodiment for electromotoric brake systems, the brake torque, which is to be adjusted (for example, within the wheel brake components) is converted directly into current or voltage quantities. The brake loop components as well as the pump can be omitted as required.

The detailing of the brake system component shown in FIG. 7 is characterized by the following communication relationships. The wheel brake coordinator distributes the supplied orders with respect to the wheel desired torques to the individual wheel brakes likewise as an order. In the case of a hydraulic braking system, the wheel brakes, in turn, make requests to the brake loops with respect to the pressure, which is to be adjusted or the volume flow (p(Fl|Fr|Rl|Rr), Vol/t(Fl|Fr|Rl|Rr)). The brake loops include the actuator elements present in each brake loop. A request relationship exists from the brake loops to the pumps and this request relationship requests the adjustment of a volume flow (Vol/t(Bk|Bk2)) from the pumps.

Figure 8:
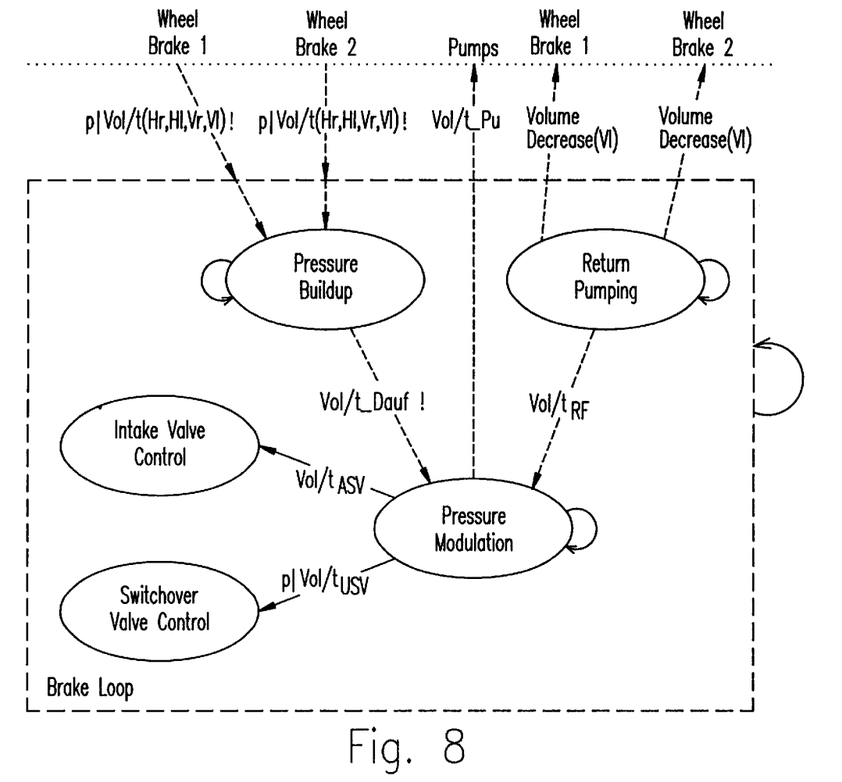
FIG. 8 shows a detailing of a brake loop component provided for the case of a hydraulic brake system.

FIG. 8 shows a preferred embodiment of a detailing of a brake loop component provided in the case of a hydraulic brake system. This component includes the functions and actuator elements present in each brake loop. In the preferred embodiment in a two-loop brake system, each loop has a brake loop component. These components coordinate the requests relating to the pressures or volume flows to be realized which are made by the particular components "wheel brakes". The modulation strategy is an essential content of the brake loop components. The generation of additional necessary volume flows is requested from the pump component. Depending upon the nature of the modulation, the wheel brake components alternately request pressures or volume flows.

The component "brake loop" ensures that the required hydraulic liquid volumes are supplied to or are taken away from the wheel brakes. The wheel brakes are connected together to a loop. If the wheel brake component requires additional volumes, then a volume flow request or pressure request is made to the brake loop component. The task of the brake loop component is to coordinate the requests of the hydraulically coupled brakes, which requests are made independently of each other. The volumes, which are reduced by the wheel brakes of a loop, are to be monitored. Likewise, the fill level of the storage chamber, if present, is to be monitored. Excess volumes are to be pumped away. Drives of the brake loop specific actuators (for example, intake valve, switchover valve) are to be undertaken and volume flows, which are to be moved by the pump, are to be requested.

The communication of the brake loop component shows the following relationships. Inherent as an order of the brake loop component, the coordination of the volume flow or the pressure realization is provided so that both wheel brake components, which are assigned to this brake loop, can satisfy their tasks. Pressure desired values or volume flow desired values (p(Fl|Fr|Rl|Rr), Vol/t(Fl|Fr|Rl|Rr)) go as requests from the corresponding wheel brake components to realize the desired wheel brake torques which requests are transmitted further to the pressure buildup components. The pressure buildup component emits a resulting request Vol/t_Dauf with respect to the volume flow to the pressure modulation component. This component has an inherent order to satisfy this request simultaneously with the volume flow request of the return pump component. The pressure modulation component emits the volume flow Vol/t_Pu which is to be realized as an order to the pump component and charges the valve controls with the adjustment of specific pressure or volume flow in each case. The volume flow Vol/t_Pu is to be prepared for the wheel brake torque realization. A return pumping component has the inherent task to control the volumes which are to be pumped away in the case of pressure reduction. For this purpose, via requests to the wheel brake components, the volumes VolAbbau which are to be reduced, are determined and, if required, the fill level of the storage chamber is monitored and a resulting request as to volume flow, which is to be adjusted, is transmitted to the pressure modulation component. The pressure modulation component converts this request into a suitable request to the pump component.

Figure 9:
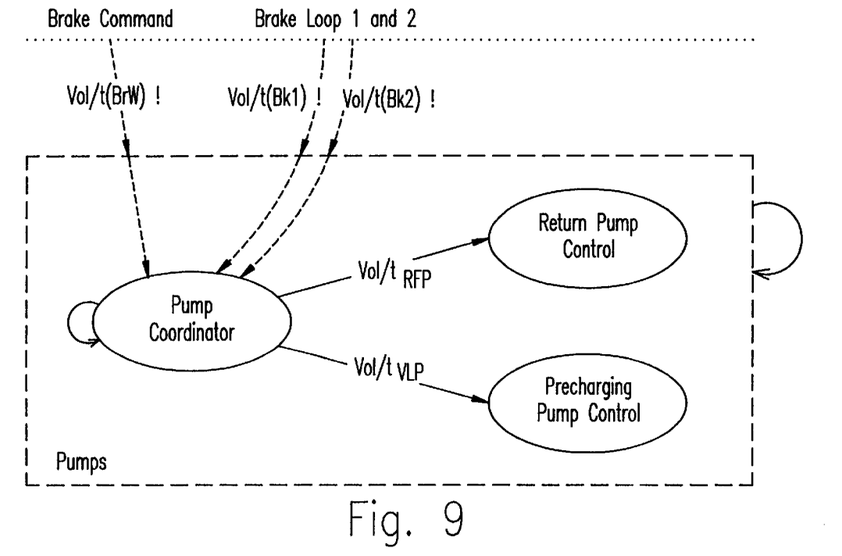
FIG. 9 shows a detailing of the component "pump" which belongs to a hydraulic brake system.

In FIG. 9, a detailing of the component "pump" is shown which belongs to the embodiment of a hydraulic brake system. This component includes the drive of the hydraulic pump(s). These pumps serve the requirements of both brake loops as well as the brake command with respect to desired volume flows. In ABSR systems, only a return pump is present and for driver dynamic control systems additionally a precharging pump as may be required. The component comprises a pump coordinator, a return pump control and a precharging pump control. The inherent task is to pump the required hydraulic volumes for pressure modulation in the brake loops as well as to generate a pedal return action for the driver. The purpose can be, on the one hand, a pressure reduction at the suction end or, on the other hand, a pressure buildup. The brake loop components themselves provide for the matched valve drive within the brake loops. The coupling of the brake loops is thereby considered at a position in the structure, namely, at the pump component. A counterforce must act on the brake pedal in order to make possible a metering of the brake command by the driver; otherwise, the brake pedal would just drop away. For this reason, the volume in the main brake cylinder has to be pumped.

FIG. 9 shows as an incoming communication relationship of the pump component the following: the request from the brake command component of the volume flow Vol/t_Brw necessary for the pedal return action, the requests of the two brake loop components to realize the volume flow Vol/t (Bk1|Bk2) needed by the brake loops for pressure modulation, and the requests to the pump control to generate the volume flow to be adjusted in accordance with the inherent task to generate so much volume flow that the requirements are satisfied.

Figure 10:
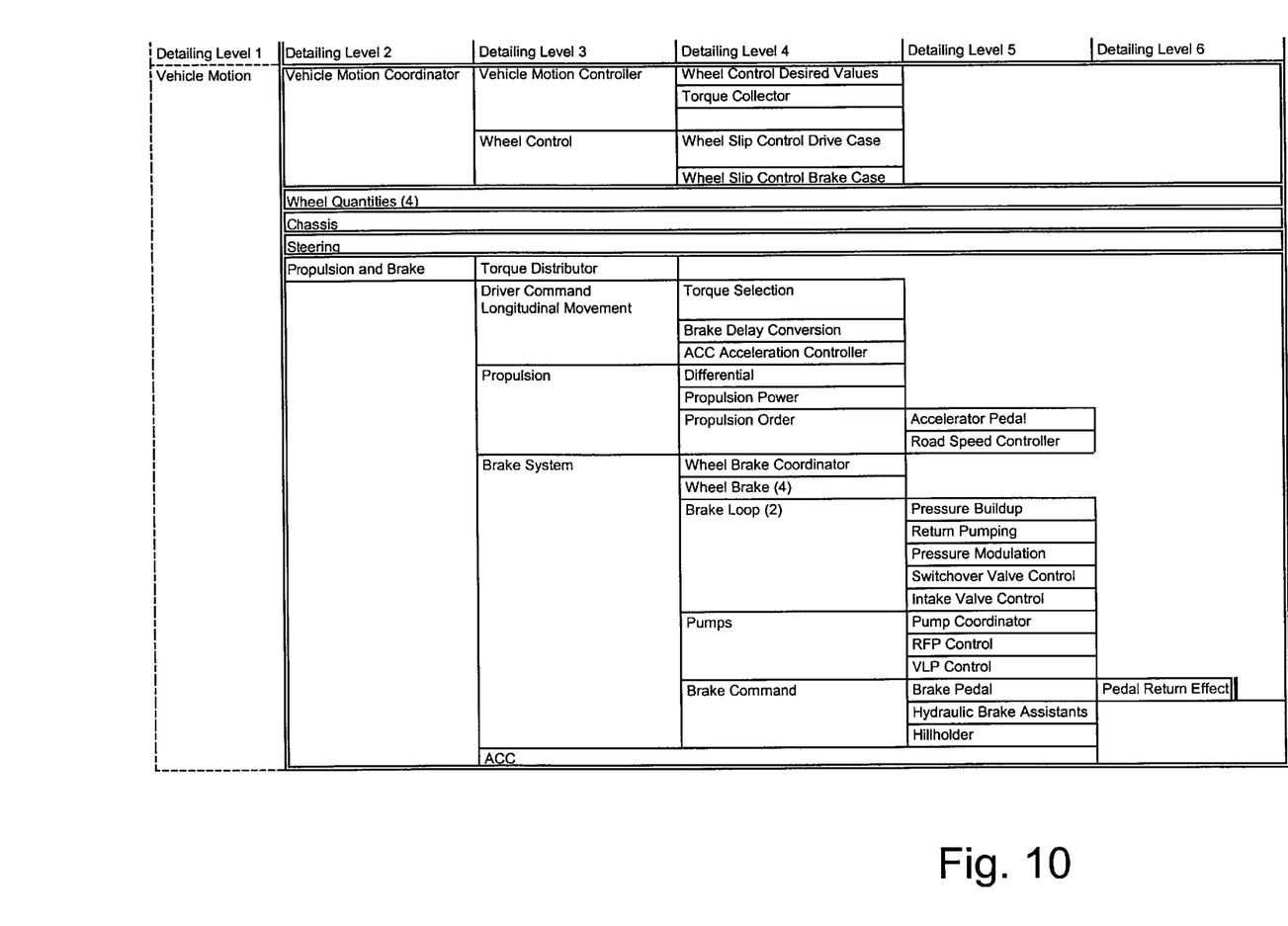
FIG. 10 shows the individual components as a table.

FIG. 10 shows the individual components as a table. The first detailing level defines the vehicle motion component. In the second detailing level, the following are contained: the component "vehicle coordinator", the component "wheel quantities", the component "chassis and steering" as well as the component "propulsion and brake". The third detailing level includes in the vehicle movement coordinator the vehicle motion controller as well as the wheel controller and in the component "propulsion and brake", the torque distributor, the driver command longitudinal movement component, the propulsion and brake system components. The fourth detailing level includes, with respect to the vehicle movement controller, components for forming the wheel control desired values and for collecting the effective torques, with respect to the wheel control, the wheel slip control for the drive case and the wheel slip control for the braking case. The driver desired longitudinal movement controller includes, in detailing level 4, the torque selection, the deceleration converter and the ACC acceleration controller; whereas, in the detailing level 4 with respect to the propulsion component, the following are arranged: the differential component, the propulsion power and the propulsion command. The propulsion command is refined in the detailing level 5 into the accelerator pedal and road speed controller. The brake system component is refined in the example of a hydraulic brake system in detailing level 4 into the wheel brake coordinator component, wheel brake components, brake loop components, pump components and brake command components. The brake loop is refined in detailing level 5 into the pressure reduction component, return pumping component, pressure modulation component, switchover valve control component and intake valve control; whereas, the pump component is refined in the detailing level 5 into pump coordinator, return pump control and precharging pump control, when present. With respect to the brake command component in detailing level 5, the brake pedal component, brake assistant component, and hill holder component are provided. The brake pedal component includes in the detailing level 6 also the pedal return action component.

What is claimed is:

1. A system for controlling the motion of a vehicle comprising:

an uppermost logic level for controlling said vehicle;

said uppermost logic level including at least one component for controlling the motion of said vehicle;

a plurality of detailing levels lying below said uppermost logic level;

said one component being apportioned into a plurality of components lying in said detailing levels;

said one component being apportioned in a first one of said detailing levels into a component for coordinating the vehicle motion and a component for controlling propulsion and braking;

said component for controlling propulsion and braking being apportioned in a second one of said detailing levels below said first detailing level into a component for controlling propulsion and a component for controlling the braking system;

said components functioning to communicate with each other on the basis of pregiven communication relationships;

said component for coordinating the vehicle motion functioning to issue commands to said component for controlling propulsion and braking with respect to first desired values (Mwheeldes) which are to be adjusted; and, said component for controlling propulsion and braking functioning to issue commands with respect to second desired values (MAwheeldes, MBwheeldes) to said component for controlling propulsion and said component for controlling said braking system in dependence upon said first desired values (Mwheeldes).

2. The system of claim 1, wherein wheel torques are to be adjusted on said vehicle; and, wherein said one component for controlling the motion of said vehicle functions to transmit desired values for said wheel torques to at least said component for controlling propulsion or said component for controlling the braking system to ensure a stable vehicle motion.

3. The system of claim 1, wherein: said one component for controlling the motion of said vehicle includes a coordinator which has an order relationship as a communication relationship to said component for controlling propulsion and braking via which desired wheel torques are inputted; and, a request relationship is present between said component for controlling propulsion and braking and said component for coordinating the vehicle motion via which command wheel torques are transmitted.

4. The system of claim 1, wherein an adaptive road speed controller is assigned additionally to said component for propulsion and braking.

5. The system of claim 3, wherein: the order relationship leads from said component for coordinating the vehicle motion to a torque distributor as part of said component for controlling propulsion and braking and, from said torque distributor, orders are transmitted further for the desired wheel torques to at least one of said components for controlling propulsion and said component for controlling said brake system.

6. The system of claim 1, wherein: a driver command longitudinal movement component is assigned to said component for controlling propulsion and braking which determines a desired wheel torque from the desired propulsion torques or desired accelerations transmitted from the component for controlling propulsion, the component for controlling the brake system and/or a component for an adaptive road speed controller.

7. The system of claim 1, wherein said component for controlling the vehicle motion includes a vehicle motion controller as well as a wheel controller.

8. The system of claim 7, wherein said vehicle motion controller outputs desired wheel torques as to said component for controlling propulsion and braking, additionally transmits requests to the wheel controller with respect to the wheel slip or the axle difference rpms and receives desired wheel torques for the drive case and/or braking case from the wheel controller.

9. The system of claim 7, wherein said wheel controller includes a wheel slip control for a drive case and a wheel slip control for a braking case.

10. The system of claim 1, wherein: said component for controlling propulsion is apportioned in a further level into differential, propulsion power and propulsion command; and, desired wheel torques are converted into a desired power which is requested by the component for propulsion as drive power from said component for coordinating the vehicle motion.

11. The system of claim 1, wherein said vehicle has wheel brakes; and, wherein said component for controlling the brake system executes a control of the wheel brakes on the basis of desired wheel torques supplied by a torque distributor.

12. The system of claim 1, wherein said component for controlling the motion of said vehicle includes a steering component for steering which, as a communication relationship to said component for coordinating vehicle motion, has a request relationship with respect to a steering command which is to be adjusted and receives an order from said component for coordinating vehicle motion as to a steering control which is to be actually realized.

13. The system of claim 1, wherein the said component for controlling the vehicle motion includes a chassis component, which has, as a communication relationship, a request relationship with respect to a chassis desired performance to said component for coordinating the vehicle motion and receives an order therefrom as to the chassis drive to be actually realized.

* * * * *